United States Patent
Chen

(10) Patent No.: US 6,195,421 B1
(45) Date of Patent: Feb. 27, 2001

(54) CALLER ID DEVICE WITH A POWER SAVING FUNCTION

(75) Inventor: Sheng-Fan Chen, Taipei (TW)

(73) Assignee: Kin Star Technology Corp., Taipei (TW)

( * ) Notice: Subject to any disclaimer, the term of this patent is extended or adjusted under 35 U.S.C. 154(b) by 0 days.

(21) Appl. No.: 09/322,053

(22) Filed: May 27, 1999

(51) Int. Cl.[7] .......................... H04M 1/56; H04M 15/06
(52) U.S. Cl. .................. 379/142; 379/88.19; 379/88.21; 379/93.23
(58) Field of Search ................................ 379/88.19, 88.2, 379/88.21, 93.23, 120, 127, 142, 354; 455/566

(56) References Cited

U.S. PATENT DOCUMENTS

| | | | |
|---|---|---|---|
| 5,633,898 | * | 5/1997 | Kishigami et al. .................. 375/344 |
| 5,812,649 | * | 9/1998 | Shen ...................................... 379/142 |

* cited by examiner

Primary Examiner—Duc Nguyen
(74) Attorney, Agent, or Firm—Jiawei Huang; J C Patents

(57) ABSTRACT

Disclosed is a caller ID device with a power saving function according to the invention. The caller ID device, electrically coupled to a pair of telephone lines together with a telephone, includes a CAS receiver, a current limiting circuitry, an FSK receiver, an FSK mark or space tone detector, a controller and a DC battery. At an off-hook state, the current limiting circuitry can directs an operating current from the pair of telephone lines to the CAS receiver through the telephone for power supply. At an on-hook state, the FSK mark or space tone detector can detect an FSK mark or space signal from the pair of the telephone lines and then output an FSK mark or space detecting signal in response to the received FSK mark or space signal, thereby enabling the controller to activate the FSK receiver ready to receive an FSK demodulate signal from the pair of the telephone lines. As a result, the DC battery used in the inventive caller IC device can have a longer life time even though no additional AC adaptor is installed.

17 Claims, 7 Drawing Sheets

CALLER ID DEVICE WITH A POWER SAVING FUNCTION

BACKGROUND OF THE INVENTION

1. Field of the Invention

The invention relates to a caller ID device, and in particular to a caller ID device with a power saving function by additionally using a current limiting circuitry and/or an FSK mark or space tone detector.

2. Description of the Related Art

A caller ID service that has been widely used in the North American countries can inform a user of the telephone number and the name of a calling party. Furthermore, with such a caller ID service provided, the user can be informed of the telephone number and the name of the calling party regardless of being at an off-hook state or an on-hook state.

Referring to FIG. 1, a conventional caller ID device 20 and a telephone 10 is shown. In FIG. 1, the conventional caller ID device 20 is electrically coupled to a pair of telephone lines (i.e., a tip terminal and a ring terminal) together with the telephone 10. The conventional caller ID device 20 includes a CAS (Customer Premises Equipment Alerting Signal) receiver 24, an FSK (Frequency Shift Keying) receiver 26, a controller 22, a voltage regulator 28, an LCD display 29, a DC battery 30 and an AC adaptor 32. Once the telephone 10 is switched into an off-hook state, the controller 22 detects an off-hook signal through a hook detector 12 of the telephone 10 and then outputs a control signal to activate the CAS receiver ready to receive a CAS signal from the pair of the telephone lines. If a CAS signal is coming from the telephone exchange through the pair of the telephone lines and received by the CAS receiver 24, the CAS receiver 24 outputs a CAS detecting signal to the controller 22. In response to the received CAS detecting signal, the controller 22 outputs a control signal to a speech network 14 of the telephone 10 to mute receiving and transmitting speech signals and another control signal to activate the FSK receiver 26 ready to receive an FSK modulated signal from the pair of the telephone lines. At the same time, a DTMF signal that represents a "D" signal with frequencies of 941 Hz and 1633 Hz is output from the controller 22 to the speech network 14 so as to inform the telephone exchange that FSK modulated data containing the telephone number and the name of a calling party can be send out. When the activated FSK receiver 26 receives an FSK modulated signal from the pair of the telephone lines, the FSK receiver 26 demodulates it into an FSK demodulated signal. Then, the FSK demodulated signal is outputted from the FSK receiver 26 to the controller 22 and then displayed on the LCD display 29.

On the other hand, when the telephone is switched into an on-hook state, the controller 22 detects an on-hook signal through the hook detector 12 and outputs a control signal to activate the FSK receiver 26 ready to receive FSK modulated data. Similarly, the activated FSK receiver can receive and demodulate an FSK modulated signal coming from the pair of the telephone lines into an FSK demodulated signal. Thereafter, the FSK demodulated signal is transmitted to the controller 22 from the FSK receiver 26 and then displayed on the LCD display 29. Typically, an on-hook data transmission FSK modulated signal consists of a channel seizure signal with a duration of 300 m sec, a mark signal with a duration of 50 m sec and a data signal in sequence as shown in FIG. 2, wherein the channel seizure signal is a dual-frequency signal having a mark frequency and a space frequency alternating at 1200 baud with each other.

In the conventional caller ID device 20, the CAS receiver 24 and the FSK receiver 26 are continuously activated once at an on-hook state and an off-hook state, respectively, resulting in more power consumption. Even though the AC adaptor 32 additionally used can last the life time of the DC battery 30, more power consumption caused by both the CAS receiver 24 and the FSK receiver 26 still exits.

SUMMARY OF THE INVENTION

In view of the above, the invention provides a first caller ID device with a power saving function. The first caller ID device, electrically coupled to a pair of telephone lines together with a telephone, includes a CAS receiver, a current limiting circuitry, a diode, an FSK receiver, a controller, a display and a battery. The CAS receiver is used to receiver a CAS signal from the pair of the telephone lines and then to transmit a CAS detecting signal in response to the received CAS signal after the CAS receiver is activated at an off-hook state. The current limiting circuitry has an input end electrically coupled to the telephone and an output end electrically coupled to the CAS receiver for directing an operating current from the pair of telephone lines to the CAS receiver through the telephone at the off-hook state. The diode has a p-type end and an n-type end which is electrically coupled to the output end of the current limiting circuitry. The FSK receiver is used to receive and to demodulate an FSK modulated signal from the pair of the telephone lines into an FSK demodulated signal after the FSK receiver is activated. The controller is used to activate the CAS receiver when the controller detects the telephone is at the off-hook state, to activate the FSK receiver when receiving the CAS detecting signal from the CAS receiver, to receive the FSK demodulated signal from the FSK receiver, and to inactivate the activated FSK receiver once the controller detects no FSK demodulated signal received or already receives the FSK demodulated signal. The display is used to display the FSK demodulated signal output from the controller. And, the battery has a positive polarity electrically coupled to the p-type end of the diode, the FSK receiver and the controller for power supply and a negative polarity electrically coupled to ground. At the on-hook state, the battery further provides a standby current to the CAS receiver through the diode.

In the first caller ID device, there is no need to have an additional AC adaptor installed to last the life time of the DC battery because the current limiting circuitry is used to direct an operating current from the pair of telephone lines to the activated CAS receiver for power supply at the off-hook state. That is, the use of the DC battery can last for a long period of time even though without installing an additional AC adaptor.

Furthermore, the invention provides a second caller ID device with a power saving function. The second caller ID device, electrically coupled to a pair of telephone lines together with a telephone, includes an FSK receiver, an FSK mark or space tone detector, a controller, a display and a battery. The FSK receiver is used to receive and to demodulate an FSK modulated signal from the pair of the telephone lines into an FSK demodulated signal after the FSK receiver is activated. The FSK mark or space tone detector is used to detect an FSK mark or space signal from the pair of telephone lines and then to output an FSK mark or space detecting signal in response to the received FSK mark or space signal at an on-hook state. The controller is used to activate the FSK receiver when receiving the FSK mark or space detecting signal from the FSK mark or space tone detector, to receive the FSK demodulated signal from the FSK receiver and to inactivate the activated FSK receiver once the controller detects no FSK demodulated signal received or already receives the FSK demodulated signal, and then resets the FSK mark or space tone detector. The display is used to display the FSK demodulated signal output from the controller. And, the battery has a positive polarity electrically coupled to the CAS receiver, the FSK receiver, the FSK mark or space tone detector and the controller for power supply and a negative polarity electrically coupled to ground.

In the second caller ID device, the FSK receiver is activated at the on-hook state after the FSK mark or space tone detector detects the FSK mark or space signal and then outputs the FSK mark or space detecting signal. Therefore, only less power is consumed by the FSK receiver at the on-hook state. Additionally, the FSK mark or space tone detector itself only consumes much less power even though the FSK mark or space tone detector is continuously activated all the time. For example, the FSK mark or space tone detector can be mainly constituted by HT9274 operational amplifiers with low current consumption less than 10 µA.

Moreover, the invention provides a third caller ID device with a power saving function. The third caller ID device, electrically coupled to a pair of telephone lines together with a telephone, includes a CAS receiver, a current limiting circuitry, a diode, an FSK receiver, an FSK mark or space tone detector, a controller, a display and a battery. The CAS receiver is used to receive a CAS signal from the pair of telephone lines and then to transmit a CAS detecting signal in response to the received CAS signal after the CAS receiver is activated at an off-hook state. The current limiting circuitry has an input end electrically coupled to the telephone and an output end electrically coupled to the CAS receiver for directing an operating current from the pair of telephone lines to the CAS receiver through the telephone at the off-hook state. The diode has a p-type end and an n-type end which is electrically coupled to the output end of the current limiting circuitry. The FSK receiver is used to receive and to demodulate an FSK modulated signal from the pair of the telephone lines into an FSK demodulated signal after the FSK receiver is activated. The FSK mark or space tone detector is used to detect an FSK mark or space signal from the pair of the telephone lines and then to output an FSK mark or space detecting signal in response to the received FSK mark or space signal at an on-hook state. The controller is used to activate the CAS receiver when the controller detects that the telephone is at the off-hook state, to activate the FSK receiver when receiving the CAS detecting signal from the CAS receiver or when receiving the FSK mark or space detecting signal from the FSK mark or space tone detector, to receive the FSK demodulated signal from the FSK receiver and to inactivate the activated FSK receiver once the controller detects no FSK demodulated signal received or already receives the FSK demodulated signal and then reset the FSK mark or space tone detector. The display is used to display the FSK demodulated signal output from the controller. And, the battery has a positive polarity electrically coupled to the p-type end of the diode, the FSK receiver, the FSK mark or space tone detector and the controller for power supply and an negative polarity electrically coupled to ground. At the on-hook state, the battery further provides a standby current to the CAS receiver through the diode.

In the third caller ID device, there is no need to have an additional AC adaptor installed to last the life time of the DC battery because the current limiting circuitry is used to direct an operating current from the pair of telephone lines to the activated CAS receiver for power supply at the off-hook state. In other words, the use of the DC battery can last for a long period of time even though without installing an additional AC adaptor. Moreover, the FSK receiver is activated at the on-hook state after the FSK mark or space tone detector detects the FSK mark or space signal and then outputs the FSK mark or space detecting signal so that only less power is consumed by the FSK receiver. Additionally, in the caller ID device according to the invention, the FSK mark or space tone detector itself only consumes much less power even through the FSK mark or space tone detector is continuously activated all the time. For example, the FSK mark or space tone detector can be mainly constituted by HT9274 operational amplifiers with low current consumption less than 10 µA In a word, a caller IC device according to the invention indeed has a power saving function by using a current limiting circuitry and/or an FSK mark or space tone detector. Therefore, a DC battery used in the inventive caller ID device can have a longer life time even though no additional AC adaptor is installed

BRIEF DESCRIPTION OF THE DRAWINGS

The invention will be more fully understood from the detailed description given hereinbelow and the accompanying drawings, which are given by way of illustration only, and thus do not limit the present invention, and wherein.

DETAILED DESCRIPTION OF THE PREFERRED EMBODIMENTS

Figure 1:
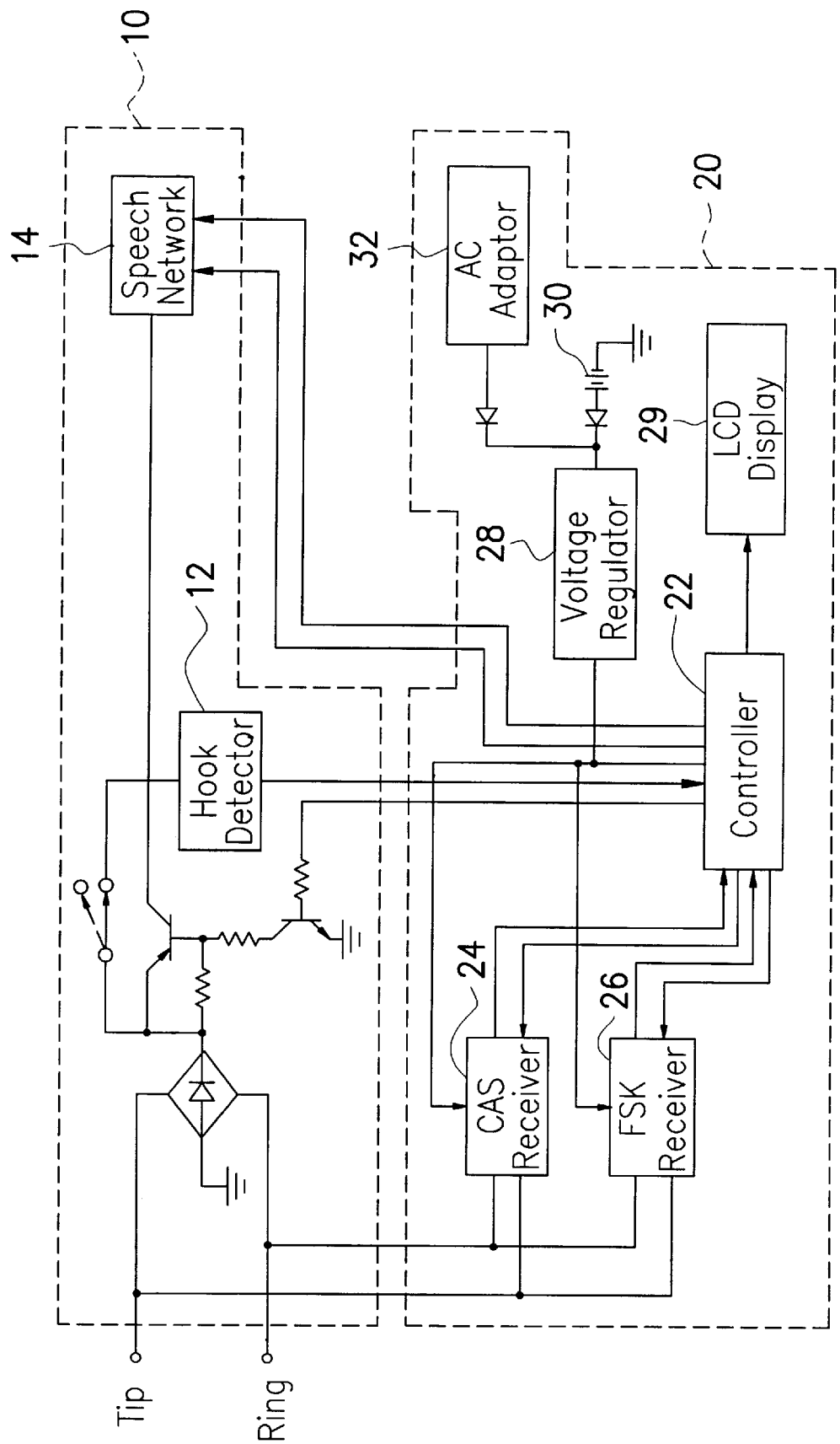
FIG. 1 is a block circuit diagram showing a caller ID device according to the prior art.
Figure 2:
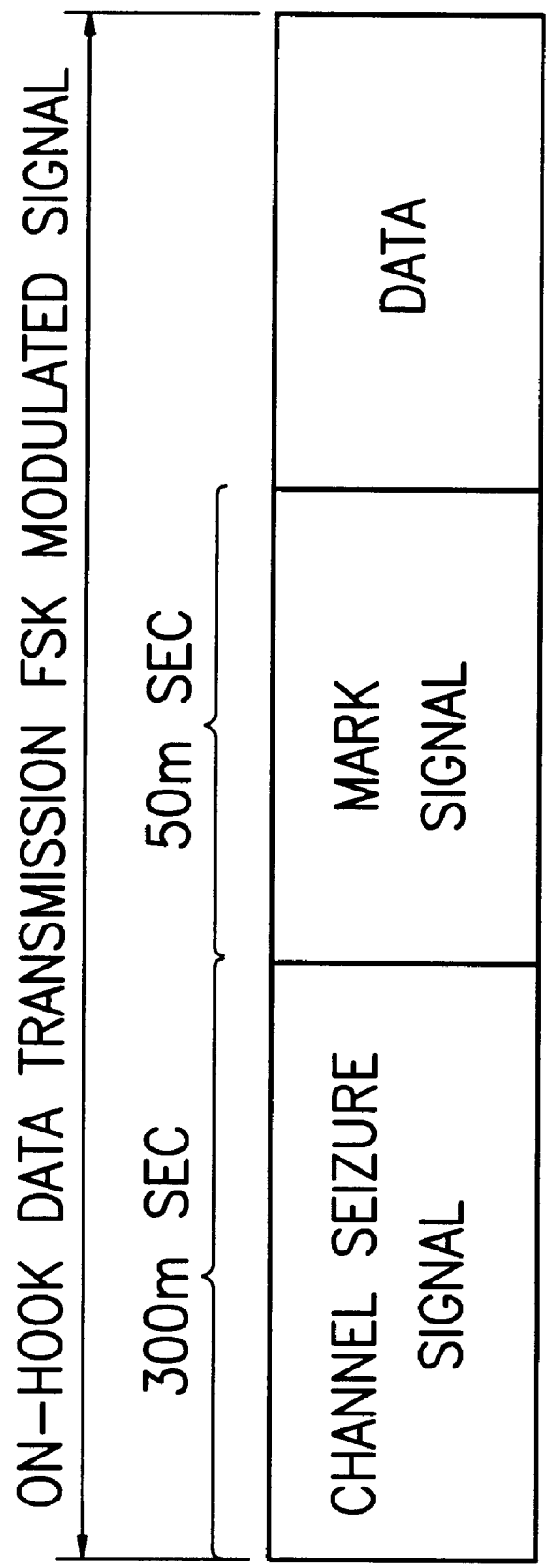
FIG. 2 is a schematic view showing an FSK modulated signal according to the prior.

In this specification, the same elements are labeled with the same reference numeral for easy description.

Embodiment 1

Figure 3:
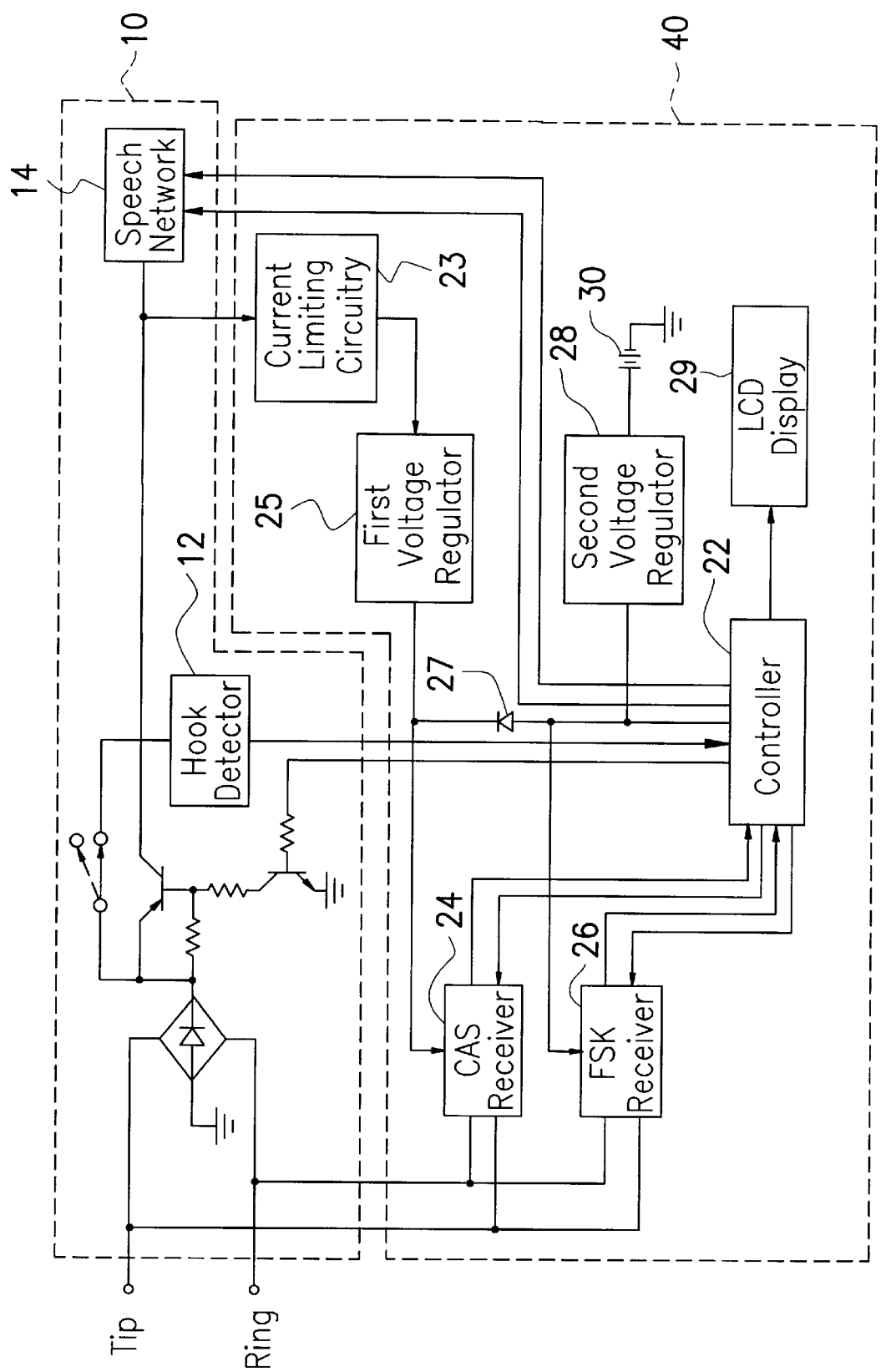
FIG. 3 is a block circuit diagram showing a caller ID device according to a first embodiment of the invention.

Referring to FIG. 3, a caller ID device 40 with a power saving function according to a first embodiment of the invention and a telephone 10 are shown. In FIG. 3, the caller ID device 40 is electrically coupled to a pair of telephone lines (i.e., a tip terminal and a ring terminal) together with the telephone 10. The inventive caller ID device 40 includes a controller 22, a current limiting circuitry 23, a CAS (Customer Premises Equipment Alerting Signal) receiver 24, a first voltage regulator 25, an FSK (Frequency Shift Keying) receiver 26, a diode 27, a second voltage regulator 28, an LCD display 29 and a DC battery 30. The current limiting circuitry 23 has an input electrically coupled to the telephone 10 and an output electrically coupled to the n-type end of the diode 27 through the first voltage regulator 25.

The DC battery 30 has a positive polarity electrically coupled to the p-type end of the diode 27, the FSK receiver 26 and the controller 22 through the second voltage regulator 28 for power supply and a negative polarity electrically coupled to ground. About the detailed operation of the inventive caller ID device 40 will be described hereinafter.

First, when the telephone 10 is switched into an off-hook state, the controller 22 detects an off-hook signal through a hook detector 12 of the telephone 10 and then outputs a control signal in response to the detected off-hook signal to activate the CAS receiver 24 ready to receive a CAS signal from the pair of telephone lines. During the off-hook state, the current limiting circuitry 23 directs an operating current from the pair of telephone lines through the telephone 10 to serve as a power source for the activated CAS receiver 24 without influence on the operation of the telephone 10 (that is, can meet the requirements of Return Loss and Echo Return Loss). If the CAS receiver 24 receives a CAS signal from the pair of the telephone lines, the CAS receiver transmits a CAS detecting signal in response to the received CAS signal to the controller 22. In response to the CAS detecting signal, the controller 22 outputs a control signal to a speech network 14 of the telephone 10 to mute receiving and transmitting speech signals and another control signal to activate the FSK receiver 26 ready to receive an FSK modulated signal from the pair of telephone lines. When the FSK receiver 26 receives an FSK modulated signal from the pair of the telephone lines, the FSK receiver 26 demodulates the received FSK modulated signal into an FSK demodulated signal. Subsequently, the FSK demodulated signal is output from the FSK receiver 26 to the controller 22 and then displayed on the LCD display 29. And, the controller 22 outputs a control signal to inactivate the FSK receiver 26 after receiving the FSK demodulated signal or detecting no FSK demodulated signal received.

Only at an on-hook state, a standby current is supplied from the DC battery 30 to the inactivated CAS receiver 24 through the diode 27.

It is obvious from the first embodiment that there is no need to have an additional AC adaptor installed to last the life time of the DC battery 30 because the current limiting circuitry 23 is used to direct an operating current from the pair of telephone lines to the activated CAS receiver 24 for power supply at the off-hook state. That is, the use of the DC battery 30 can last for a long period of time even though without installing an additional AC adaptor.

Embodiment 2

Figure 4:
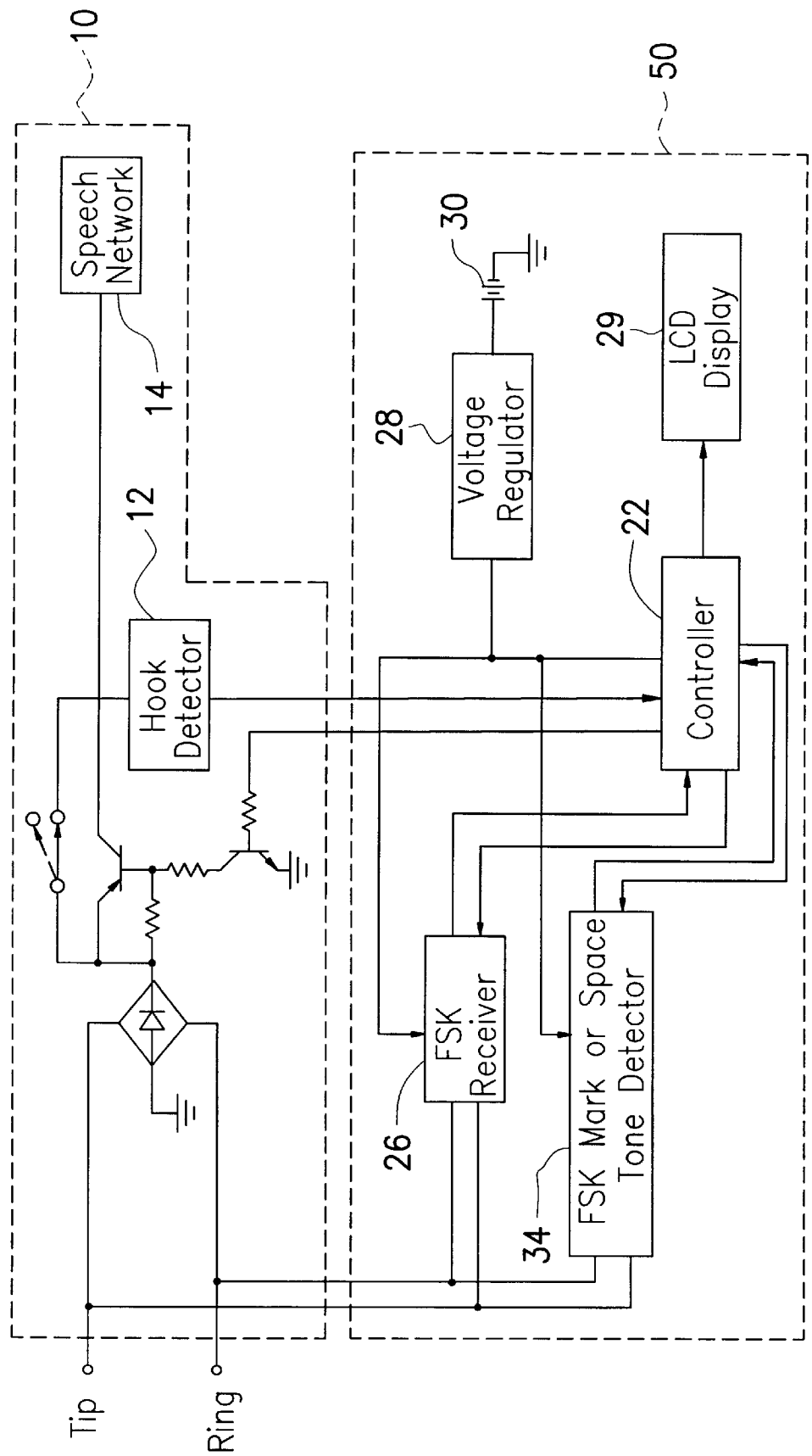
FIG. 4 is a block circuit diagram showing a caller ID device according to a second embodiment of the invention.

FIG. 4 shows a caller ID device 50 with a power saving function according to a second embodiment of the invention and a telephone 10. As shown in FIG. 4, the caller ID device 50 is electrically coupled to a pair of telephone lines (i.e., a tip terminal and a ring terminal) together with the telephone 10. The caller ID device 50 includes a controller 22, an FSK receiver 26, a voltage regulator 28, an FSK mark or space tone detector 34, an LCD display 29 and a DC battery 30. The DC battery 30 has a positive polarity electrically coupled to the controller 22, the FSK receiver 26 and the FSK mark or space tone detector 34 through the voltage regulator 28 for power supply and a negative polarity electrically coupled to ground.

As to the operation of the caller ID device 50, first, when the telephone 10 is switched into an on-hook state, the controller 22 outputs a control signal to inactivate the FSK receiver 26. At this time, if the FSK mark or space detector 34 detects an FSK mark or space signal, the FSK mark or space detector 34 outputs an FSK mark or space detecting signal to the controller 22. In response to the received FSK mark or space detecting signal, the controller 22 outputs a control signal to activate the FSK receiver 26 ready to receive an FSK modulated signal from the pair of telephone lines. When the FSK receiver 26 receives an FSK modulated signal, the FSK receiver 26 demodulates the received FSK modulated signal into an FSK demodulated signal. Thereafter, the controller 22 receives the FSK demodulated signal from the FSK receiver 26 for display on the LCD display 29 and then outputs a control signal to inactivate the FSK receiver 26 and another control signal to reset the FSK mark or space tone detector 34 for next FSK mark or space detection. However, if the controller 22 does not detect any FSK demodulated signal received, the controller 22 also outputs a control signal to inactivate the FSK receiver 26 and another control signal to reset the FSK mark or space tone detector 34 for next FSK mark or space signal detection.

As can be obviously seen from the second embodiment, the FSK receiver 26 is activated at the on-hook state after the FSK mark or space tone detector 34 detects the FSK mark or space signal and then outputs the FSK mark or space detecting signal. Consequently, only less power is consumed by the FSK receiver 24 at the on-hook state. Moreover, in the caller ID device 50 according to the invention, the FSK mark or space tone detector 34 itself only consumes much less power even though the FSK mark or space tone detector 34 is continuously activated all the time. For example, the FSK mark or space tone detector 34 can be mainly constituted by HT9274 operational amplifiers with low current consumption less than 10 $\mu$A.

Embodiment 3

Figure 5:
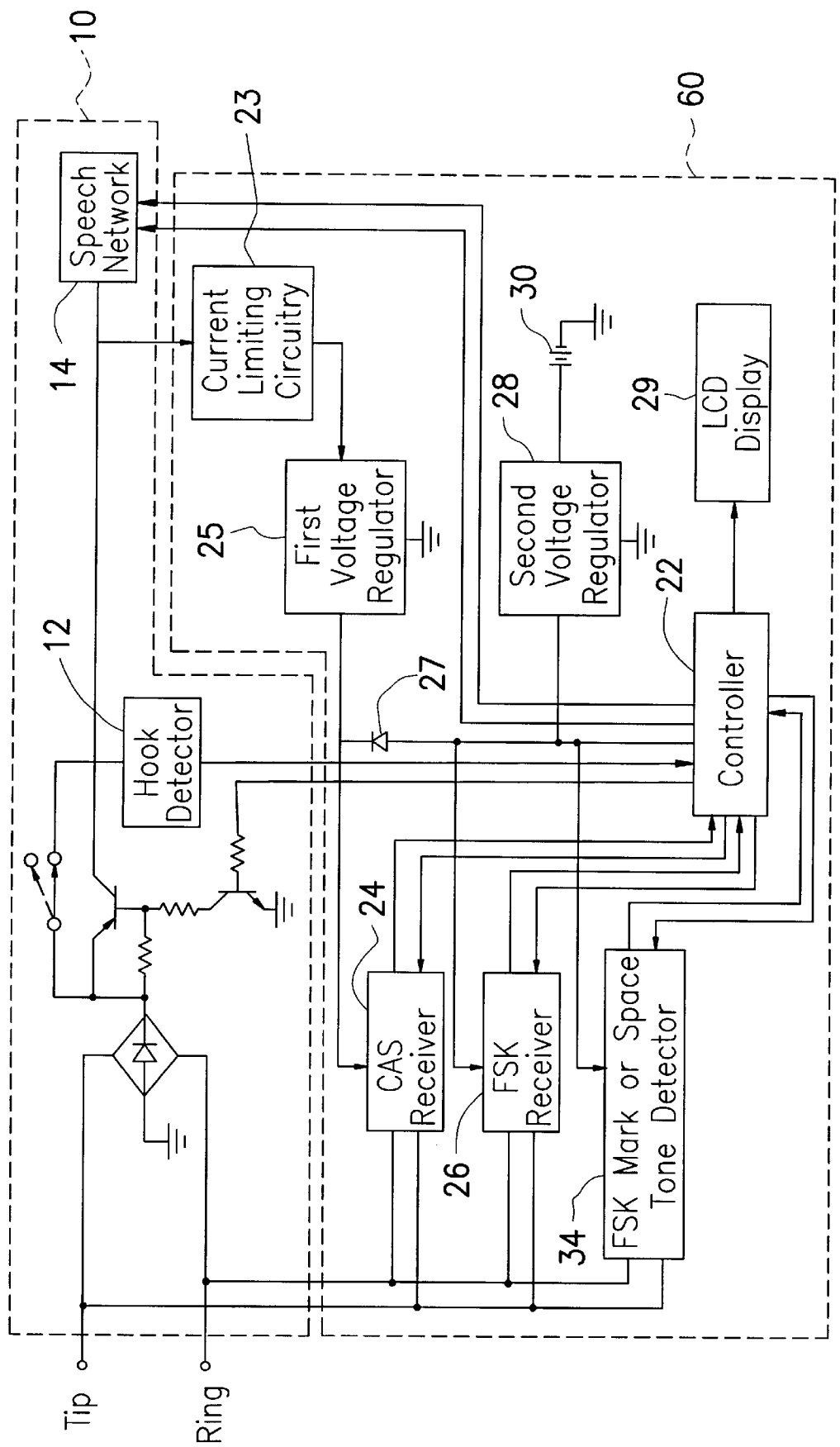
FIG. 5 is a block circuit diagram showing a caller ID device according to a third embodiment of the invention.

Referring to FIG. 5, a caller ID device 60 with a power saving function according to a third embodiment of the invention and a telephone 10 is shown. In FIG. 5, the caller ID device 60 is electrically coupled to a pair of telephone lines together with the telephone 10. The caller ID device 60 includes a controller 22, a current limiting circuitry 23, a CAS receiver 24, a first voltage regulator 25, an FSK receiver 26, a diode 27, a second voltage regulator 28, an LCD display 29, a DC battery 30 and an FSK mark or space tone detector 34. The current limiting circuitry 23 has an input electrically coupled to the telephone 10 and an output electrically coupled to the n-type end of the diode 27 through the first voltage regulator 25. The DC battery 30 has a positive polarity electrically coupled to the p-type end of the diode 27, the FSK receiver 26, the FSK mark or space tone detector 34 and the controller 22 through the second voltage regulator 28 for power supply and a negative polarity electrically coupled to ground. Next, the detailed operation of the caller ID device 60 will be described.

First, when the telephone 10 is switched into an off-hook state, the controller 22 detects an off-hook signal through a hook detector 12 of the telephone 10 and then outputs a control signal in response to the detected off-hook signal to activate the CAS receiver 24 ready to receive a CAS signal from the pair of telephone lines. At the off-hook state, the current limiting circuitry 23 directs an operating current from the pair of telephone lines through the telephone 10 to serve as a power source for the activated CAS receiver 24 without influence on the operation of the telephone 10 (that is, can meet the requirements of Return Loss and Echo Return Loss). If the CAS receiver 24 receives a CAS signal from the pair of the telephone lines, the CAS receiver 24 transmits a CAS detecting signal in response to the received CAS signal to the controller 22. In response to the CAS detecting signal, the controller 22 outputs a control signal to a speech network 14 of the telephone 10 to mute receiving and transmitting speech signals and another control signal to activate the FSK receiver 26 ready to receive an FSK modulated signal from the pair of telephone lines. When the FSK receiver 26 receives an FSK modulated signal from the pair of the telephone lines, the FSK receiver 26 demodulates the received FSK modulated signal into an FSK demodulated signal. Subsequently, the FSK demodulated signal is output from the FSK receiver 26 to the controller 22 for display on the LCD display 29. Moreover, the controller 22 outputs a control signal to inactivate the FSK receiver 26 after receiving the FSK demodulated signal or detecting no FSK demodulated signal received.

On the other hand, when the telephone 10 is switched into an on-hook state, the controller 22 outputs control signals to inactivate the FSK receiver 26 and the CAS receiver 24. At this point, if the FSK mark or space tone detector 34 detects an FSK mark or space signal from the pair of the telephone lines, the FSK mark or space detector 34 outputs an FSK mark or space detecting signal to the controller 22. In response to the received FSK mark or space detecting signal, the controller 22 outputs a control signal to activate the FSK receiver 26 ready to receive an FSK modulated signal from the pair of the telephone lines. When the FSK receiver 26 receives an FSK modulated signal, the FSK receiver 26 demodulates the received FSK modulated signal into an FSK demodulated signal. After that, the controller 22 receives the FSK demodulated signal from the FSK receiver 26 for display on the LCD display 29 and then outputs a control signal to inactivate the FSK receiver 26 and another control signal to reset the FSK mark or space tone detector 34 for next FSK mark or space signal detection. However, if the controller 22 does not detect any FSK demodulated signal received, the controller 22 also outputs a control signal to inactivate the FSK receiver 26 and another control signal to reset the FSK mark or space tone detector 34 for next FSK mark or space signal detection.

Apparently from the third embodiment, there is no need to have an additional AC adaptor installed to last the life time of the DC battery 30 because the current limiting circuitry 23 is used to direct an operating current from the pair of telephone lines to the activated CAS receiver 24 for power supply at the off-hook state. In other words, the use of the DC battery 30 can last for a long period of time even though without installing an additional AC adaptor. Moreover, the FSK receiver 26 is activated at the on-hook state after the FSK mark or space tone detector 34 detects the FSK mark or space signal and then outputs the FSK mark or space detecting signal so that only less power is consumed by the FSK receiver 24. Additionally, in the caller ID device 60 according to the invention, the FSK mark or space tone detector 34 itself only consumes much less power even through the FSK mark or space tone detector 34 is continuously activated all the time. For example, the FSK mark or space tone detector 34 can be mainly constituted by HT9274 operational amplifiers with low current consumption less than 10 $\mu$A.

Figure 6:
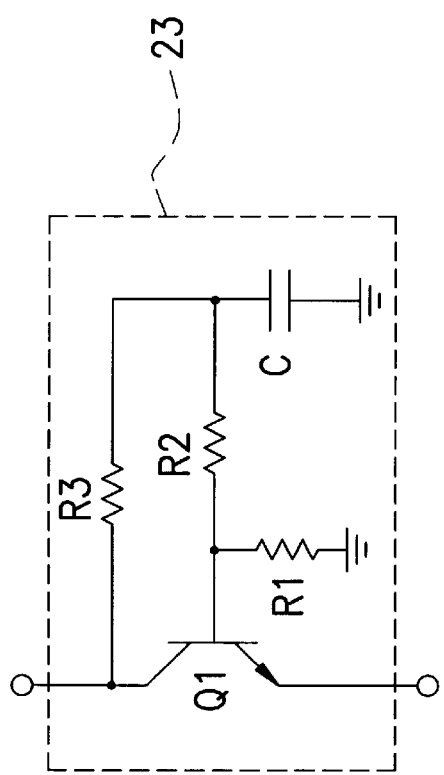
FIG. 6 is an exemplary circuit diagram of a current limiting circuitry according to the invention.

Furthermore, FIG. 6 shows an exemplary circuit diagram of the current limiting circuitry 23 in the embodiments 1, 2 and 3, including an NPN transistor Q1, a first resistor R1, a second R2, a third resistor R3 and a capacitor C. As shown in FIG. 6, the collector of the NPN transistor Q1 serves as the input of the current limiting circuitry 23 while its emitter serves as the output of the current limiting circuitry 23. The first resistor R1 has one end electrically coupled to the base of the NPN transistor Q1 and the other end electrically coupled to ground. The second resistor R2 has one end electrically coupled to the base of the NPN transistor Q1. The third resistor R3 has one end electrically coupled to the collector of the NPN transistor Q1 and the other end electrically coupled to the other end of the second resistor R2. And, the capacitor C has one end electrically coupled to the second end of the second resistor R2 and the other end electrically coupled to ground.

Figure 7:
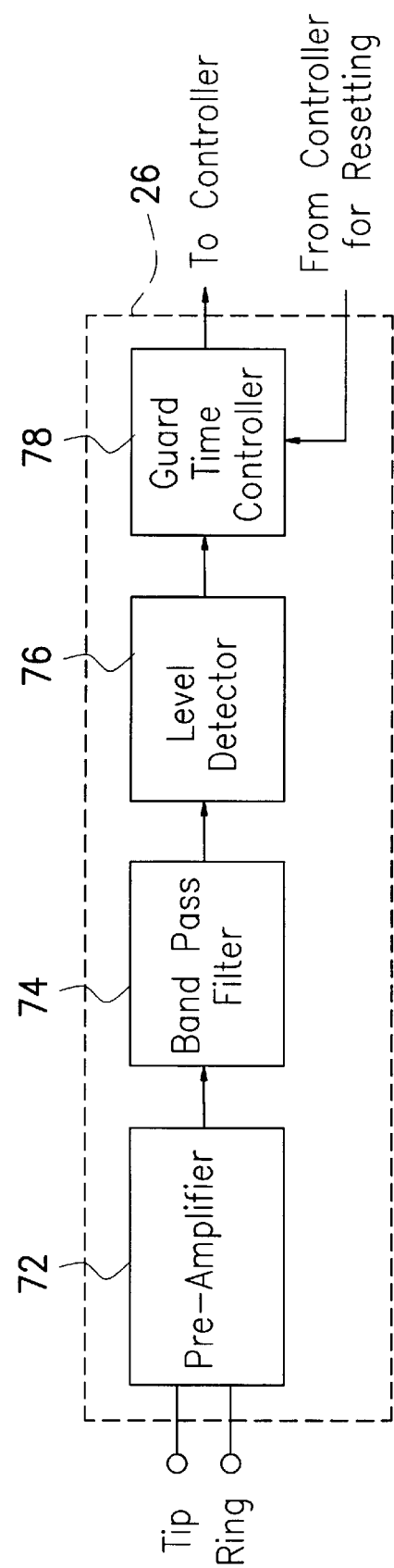
FIG. 7 is a block circuit diagram of an FSK mark or space tone detector according to the invention.

With respect to the FSK mark or space tone detector 34 described in the embodiments 2, 3 and 4, it includes a pre-amplifier 72, a band pass filter, a level detector and a guard time controller 76 as shown in FIG. 7. The pre-amplifier 72 has an input electrically coupled to the pair of telephone lines and an output electrically coupled to the input of the band pass filter 74 for pre-amplifying a receiving FSK modulated signal. The band pass filter 74 has an output electrically coupled to the input of the level detector 76 for only extracting a mark signal with a frequency of, such as 1,200 Hz, or a space signal with a frequency of, such as 2,200 Hz, from the received FSK modulated signal. The level detector 76 has an input electrically coupled to the output of the band pass filter 74 for detecting whether the amplitude of an extracted mark or space signal is larger than a predetermined one. The guard time controller 78 has a first input electrically coupled to the output of the guard time controller 78, a second input electrically coupled to the controller 22 and an output electrically coupled to the controller 22 for detecting whether the detected mark or space signal output from the level detector 76 lasts longer than a predetermined time.

Figure 8:
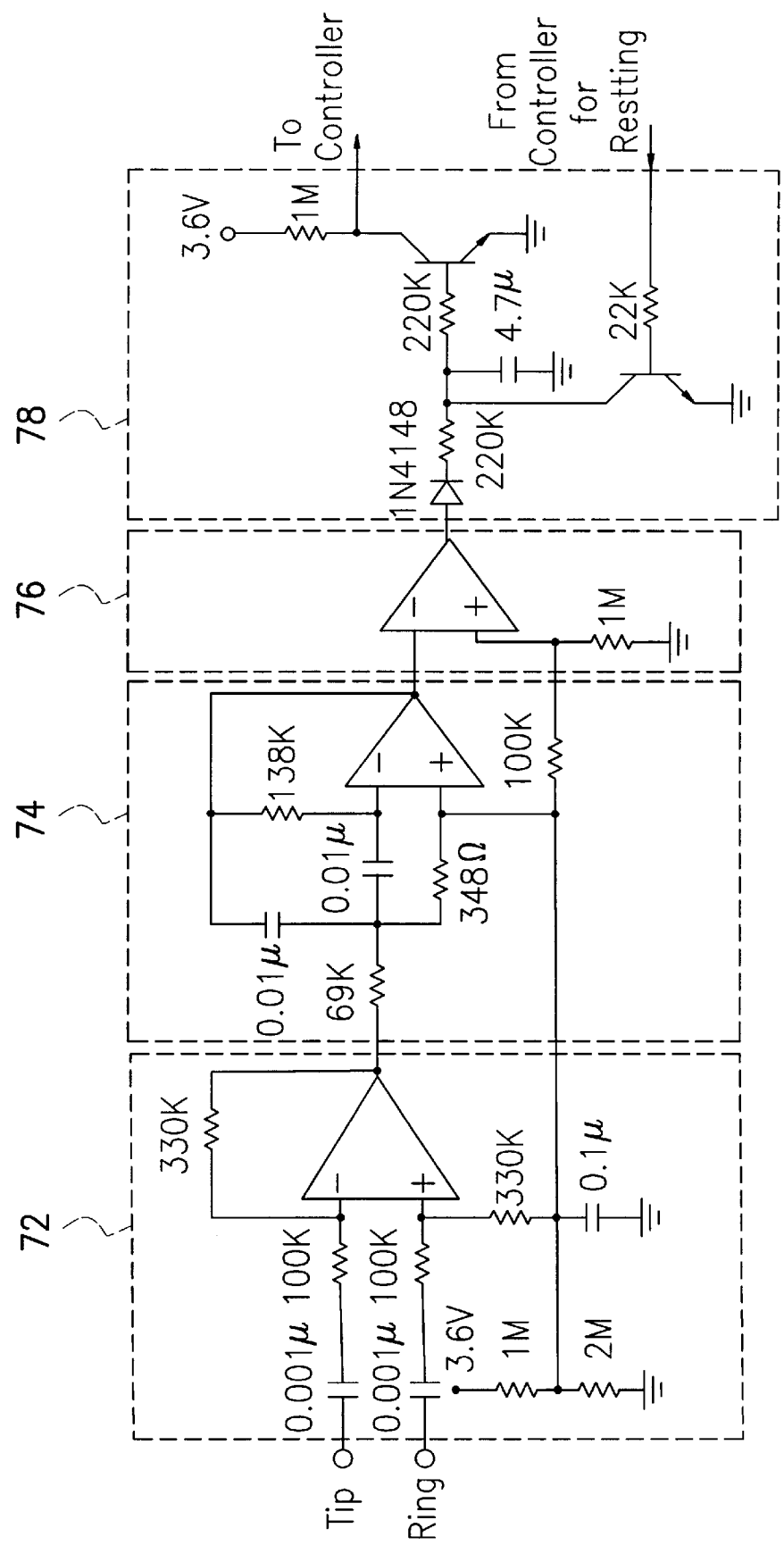
FIG. 8 is an exemplary circuit diagram of the FSK mark or space tone detector of FIG. 7.

Moreover, FIG. 8 shows an exemplary circuit diagram of the FSK mark or space tone detector 34 described in embodiment 2, 3 and 4, used for detecting an FSK space signal with a frequency of 2,200 Hz.

In summary, a caller ID device according to the invention indeed has a power saving function by using a current limiting circuitry and/or an FSK mark or space tone detector. Therefore, a DC battery used in the inventive caller ID device can have a longer life time even though no additional AC adaptor is installed.

While the invention has been described by way of example and in terms of the preferred embodiment, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A caller ID device with a power saving function, electrically coupled to a pair of telephone lines together with a telephone, comprising:

a CAS receiver for receiving a CAS signal from the pair of the telephone lines and then transmitting a CAS detecting signal in response to the received CAS signal after the CAS receiver is activated at an off-hook state;

a current limiting circuitry having an input end electrically coupled to the telephone and an output end electrically coupled to the CAS receiver for directing an operating current from the pair of telephone lines to the CAS receiver through the telephone at the off-hook state;

an FSK receiver for receiving and demodulating an FSK modulated signal from the pair of the telephone lines into an FSK demodulated signal after the FSK receiver is activated;

a controller for activating the CAS receiver when the controller detects the telephone is at the off-hook state, for activating the FSK receiver when receiving the CAS detecting signal from the CAS receiver, for receiving the FSK demodulated signal from the FSK receiver and for inactivating the activated FSK receiver once the controller detects no FSK demodulated signal received or already receives the FSK demodulated signal;

a display for displaying the FSK demodulated signal output from the controller; and a battery having a positive polarity electrically coupled to the FSK receiver and the controller for power supply and a negative polarity electrically coupled to ground.

2. The caller ID device with a power saving function as claimed in claim 1, further comprising a diode having a p-type end electrically coupled to the positive polarity of the battery and an n-type end electrically coupled to the output end of the current limiting circuitry.

3. The caller ID device with a power saving function as claimed in claim 2, further comprising a first voltage regulator electrically coupled between the output end of the current limiting circuitry and the n-type end of the diode.

4. The caller ID device with a power saving function as claimed in claim 2, further comprising a second voltage regulator between the positive polarity of the battery and the p-type end of the diode.

5. The caller ID device with a power saving function as claimed in claim 1, wherein the current limiting circuitry comprises:

an NPN transistor having a collector serving as the input end of the current limiting circuitry, an emitter serving as the output of the current limiting circuitry and a base;

a first resistor having one end electrically coupled to the base and the other end electrically coupled to ground;

a second resistor having one end electrically coupled to the base;

a third resistor having one end electrically coupled to the collector and the other end electrically coupled to the other end of the second resistor; and a capacitor having one end electrically coupled to the other end of the second resistor and the other end electrically coupled to ground.

6. The caller ID device with a power saving function as claimed in claim 1, wherein the display is an LCD display.

7. A caller ID device with a power saving function, electrically coupled to a pair of telephone lines together with a telephone, comprising:

an FSK receiver for receiving and demodulating an FSK modulated signal from the pair of the telephone lines into an FSK demodulated signal after the FSK receiver is activated;

an FSK mark or space tone detector for detecting an FSK mark or space signal from the pair of telephone lines and then outputting an FSK mark or space detecting signal in response to the received FSK mark or space signal at an on-hook state;

a controller for activating the FSK receiver when receiving the FSK mark or space detecting signal from the FSK mark or space tone detector, for receiving the FSK demodulated signal from the FSK receiver and for inactivating the activated FSK receiver once the controller detects no FSK demodulated signal received or already receives the FSK demodulated signal and then reset the FSK mark or space tone detector;

a display for displaying the FSK demodulated signal output from the controller; and a battery having a positive polarity electrically coupled to the FSK receiver, the FSK mark or space tone detector and the controller for power supply and a negative polarity electrically coupled to ground, wherein the FSK mark or space tone detector has much less power consumption, and the FSK receiver is activated at the on-hook state after the FSK mark or space tone detector detects the FSK mark or space signal.

8. The caller ID device with a power saving function as claimed in claim 7, further comprising a voltage regulator between the positive polarity of the battery and the FSK receiver, the FSK mark or space detector and the controller.

9. The caller ID device with a power saving function as claimed in claim 7, wherein the FSK mark or space detector comprises:

a pre-amplifier having an input electrically coupled to the pair of telephone lines;

a band pass filter having an input electrically coupled to the output of the pre-amplifier;

a level detector having an input electrically coupled to the output of the band pass filter; and a guard time controller having a first input electrically coupled to the output of the level detector, a second input electrically coupled to the controller for resetting and an output electrically coupled to the controller for enabling the controller to activate the FSK receiver.

10. The caller ID device with a power saving function as claimed in claim 7, wherein the display is an LCD display.

11. A caller ID device with a power saving function, electrically coupled to a pair of telephone lines together with a telephone, comprising:

a CAS receiver for receiving a CAS signal from the pair of telephone lines and then transmitting a CAS detecting signal in response to the received CAS signal after the CAS receiver is activated at an off-hook state;

a current limiting circuitry having an input end electrically coupled to the telephone and an output end electrically coupled to the CAS receiver for directing an operating current from the pair of telephone lines to the CAS receiver through the telephone at the off-hook state;

an FSK receiver for receiving and demodulating an FSK modulated signal from the pair of the telephone lines into an FSK demodulated signal after the FSK receiver is activated;

an FSK mark or space tone detector for detecting an FSK mark or space signal from the pair of the telephone lines and then outputting an FSK mark or space detecting signal in response to the received FSK mark or space signal at an on-hook state;

a controller for activating the CAS receiver when the controller detects that the telephone is at the off-hook state, for activating the FSK receiver when receiving the CAS detecting signal from the CAS receiver or when receiving the FSK mark or space detecting signal from the FSK mark or space tone detector, for receiving the demodulated FSK signal from the FSK receiver and for inactivating the activated FSK receiver once the controller detects no FSK demodulated signal received or already receives the FSK demodulated signal and then resets the FSK mark or space tone detector;

an display for displaying the FSK demodulated signal output from the controller; and a battery having a positive polarity electrically coupled to the FSK receiver, the FSK mark or space tone detector and the controller for power supply and an negative polarity electrically coupled to ground, wherein the FSK mark or space tone detector has much less power consumption and the FSK receiver is activated at the on-hook state after the FSK mark or space tone detector detects the FSK mark or space signal.

12. The caller ID device with a power saving function as claimed in claim 11, further comprising a diode having a p-type end electrically coupled to the positive polarity of the battery and an n-type end electrically coupled to the output end of the current limiting circuitry.

13. The caller ID device with a power saving function as claimed in claim 12, further comprising a first voltage regulator electrically coupled between the output end of the current limiting circuitry and the n-type end of the diode.

14. The caller ID device with a power saving function as claimed in claim 12, further comprising a second voltage regulator between the positive polarity of the battery and the p-type end of the diode.

15. The caller ID device with a power saving function as claimed in claim 11, wherein the current limiting circuitry comprises:

an NPN transistor having an collector serving as the input end of the current limiting circuitry, an emitter serving as the output of the current limiting circuitry and a base;

a first resistor having one end electrically coupled to the base and the other end electrically coupled to ground;

a second resistor having one end electrically coupled to the base;

a third resistor having one end electrically coupled to the collector and the other end electrically coupled to the other end of the second resistor; and a capacitor having one end electrically coupled to the other end of the second resistor and the other end electrically coupled to ground.

16. The caller ID device with a power saving function as claimed in claim 11, wherein the FSK mark or space tone detector comprises:

a pre-amplifier having an input electrically coupled to the pair of telephone lines;

a band pass filter having an input electrically coupled to the output of the pre-amplifier;

a level detector having an input electrically coupled to the output of the band pass filter; and a guard time controller having a first input electrically coupled to the output of the level detector, a second input electrically coupled to the controller for resetting and an output electrically coupled to the controller for enabling the controller to activate the FSK receiver.

17. The caller ID device with a power saving function as claimed in claim 11, wherein the display is an LCD display.

* * * * *